United States Patent
Kawamoto (10) Patent No.: US 6,761,239 B2
(45) Date of Patent: Jul. 13, 2004

(54) EXHAUST SYSTEM OF MOTORCYCLE (75) Inventor: Hitoshi Kawamoto, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/983,937

(22) Filed: Oct. 26, 2001

(65) Prior Publication Data

US 2002/0050415 A1 May 2, 2002

(30) Foreign Application Priority Data

Oct. 30, 2000 (JP) .................................... P 2000-331440

(51) Int. Cl.[7] .................................................. F01N 7/00
(52) U.S. Cl. .......................... 180/219; 60/313; 180/309
(58) Field of Search ................................ 180/219, 225, 180/296, 309; 60/313; 280/281.1

(56) References Cited

U.S. PATENT DOCUMENTS

| | | | | |
|---|---|---|---|---|
| 2,239,262 A | * | 4/1941 | Violet | |
| 4,817,374 A | * | 4/1989 | Kitta | 60/313 |
| 4,860,538 A | * | 8/1989 | Takeuchi | 60/313 |
| 4,896,504 A | * | 1/1990 | Matsui | 60/313 |
| 4,939,898 A | * | 7/1990 | Ichimura et al. | 60/274 |
| 4,999,999 A | * | 3/1991 | Takahashi et al. | 60/313 |
| 5,630,571 A | * | 5/1997 | Kipp et al. | 251/214 |
| 6,371,236 B1 | * | 4/2002 | Fukunaga | 180/219 |
| 6,425,451 B2 | * | 7/2002 | Yoshida et al. | 180/219 |
| 6,655,134 B2 | * | 12/2003 | Nakayasu et al. | 60/324 |

* cited by examiner

Primary Examiner—Lesley D. Morris
Assistant Examiner—Tony Winner
(74) Attorney, Agent, or Firm—Oblon, Spivak, McClelland, Maier & Neustadt, P.C.

(57) ABSTRACT

An exhaust system of a multi-cylinder engine of a motorcycle comprises exhaust pipes leading from the respective cylinders of the engine, the exhaust pipes are collected as a single exhaust pipe collection unit, a muffler to which the collection pipe section are connected, an interconnecting pipe through which the exhaust pipes and the muffler are connected, an exhaust control system for controlling pulsation of an exhaust gas, the exhaust control system including a valve mechanism disposed in operative association with the interconnecting pipe, a drive unit for operating the valve mechanism, and a central processing unit for controlling the drive unit.

5 Claims, 8 Drawing Sheets

EXHAUST SYSTEM OF MOTORCYCLE

BACKGROUND OF THE INVENTION

1. Field of the Invention

The present invention relates to an exhaust system of a motorcycle including an exhaust control system for improving an output performance of an engine thereof at an intermediate or low engine revolution range.

2. Related Art

There has been known a four-stroke-cycle multi-cylinder engine having an exhaust system in which exhaust pipes extending from cylinders are collected (or assembled) into a common exhaust pipe. This arrangement permits a negative pressure to be generated in an exhaust pipe of a cylinder which is in its suction phase due to an enhanced pulsation effect of exhaust gases, thereby achieving higher inertia charging efficiency. The pulsation effect generally varies depending on the engine speed (i.e., engine revolution range), and therefore, there has also been proposed an engine having an exhaust control system for controlling an exhaust pulsation by means of, for example, a valve disposed in an exhaust system so as to vary the cross-sectional area of an exhaust passage.

Motorcycles having exhaust control systems have also been proposed. For instance, Japanese Patent Laid-open Publication No. SHO 63-16127 (referred to as a "prior art reference 1") and Japanese Patent Laid-open Publication No. HEI 6-280577 (referred to as a "prior art reference 2") disclose motorcycles each of a type having an exhaust control system provided with a valve disposed in an exhaust collecting portion (exhaust pipe collection (assembling) section or portion) connected to the downstream ends of exhaust pipes. Likewise, Japanese Utility Model Laid-open Publication No. HEI 4-17138 (referred to as a "prior art reference 3") shows a motorcycle in which a valve of an exhaust control system is disposed at the downstream end of a muffler. Furthermore, Japanese Patent Laid-open Publication No. SHO 63-75311 (referred to as a "prior art reference 4") discloses an exhaust control system incorporated in the exhaust system of a two-stroke-cycle engine.

Provision of the exhaust control valve in the exhaust collecting portion downstream of the exhaust pipes, as proposed in the above prior art references 1 and 2, effectively enhances the pulsation effect at low or intermediate engine speed range. However, at a high speed of an engine operation, an exhaust gas flow velocity is still very high in the exhaust collecting portion. Therefore, the exhaust control system, which is disposed in a region where the exhaust gases from the cylinders are collected in each other, undesirably increases resistance against flow of the exhaust gases in the exhaust pipes, resulting in a reduction of the engine output power, thus being inconvenient.

Furthermore, in the prior art, since the collecting portion of the exhaust pipes is disposed under the engine, the provision or location of the exhaust control system in the exhaust collecting portion will disadvantageously restrict an entire volume of an oil pan of an engine unit and adversely affect the shape of cowling of a body of the motorcycle, as well as maximum bank angle thereof.

Moreover, provision or location of the exhaust control system at the downstream end of a muffler as proposed in the above prior art reference 3 cannot fully make use of the pulsation effect, because the pressure of the exhaust gas has been significantly lowered before the gas reaches the downstream end of the muffler, which is also disadvantageous.

Still furthermore, a two-stroke-cycle engine to which the above prior art reference 4 pertains has an exhaust system which is basically different from that of a four-stroke-cycle engine. For instance, in the two-stroke-cycle engine, the exhaust pipes are usually not combined into one unit.

SUMMARY OF THE INVENTION

It is an object of the present invention to substantially eliminate defects or drawbacks encountered in the prior art references mentioned above and to provide an exhaust system including an improved exhaust control system of a motorcycle, capable of effectively enhancing an engine output at low or intermediate engine speed range by effectively utilizing a pulsation effect of an exhaust gas, while reducing resistance against the flow of the exhaust gas in the exhaust pipes at a high speed operation of the engine.

The above and other objects can be achieved according to the present invention by providing an exhaust system of a motorcycle which has a body frame including a head pipe supporting a front wheel of the motorcycle, a main frame which branches, at a position immediately behind the head pipe, into a pair of lateral main frame members extending obliquely rearward and downward, a center frame including a pair of lateral center frame members connected to the rear ends of the main frame members so as to extend substantially upright, and a pair of lateral seat rails extending obliquely upward and rearward from end portions of the center frame members, and in which a swing arm supporting a rear wheel of the motorcycle is supported swingably and resiliently to the body frame by means of rear shock absorber, and a four-stroke-cycle multi-cylinder engine is mounted on to the body frame, the exhaust system comprising:
- exhaust pipes leading from the respective cylinders of the engine, the exhaust pipes being collected as a single exhaust pipe collection unit;
- a muffler to which the exhaust pipe collection unit is operatively connected;
- an interconnecting pipe unit through which the exhaust pipes and the muffler are connected; and
- an exhaust control system for controlling pulsation of an exhaust gas, said exhaust control system including a valve mechanism disposed in operative association with the interconnecting pipe unit so as to vary a cross-sectional area of an exhaust passage, and a drive unit for operating the valve mechanism.

A central processing unit for controlling the drive unit may be further provided for the exhaust control system.

In a preferred embodiment of the above aspect, the valve mechanism is located at a position under the swing arm behind the main frame within a triangular zone formed between the rear shock absorber and a bank line that indicates a maximum bank angle of a body of the motorcycle. The valve mechanism may be located at a position on a rear side of the exhaust pipe collection unit and above a road clearance level of the motorcycle body.

The valve mechanism includes a valve member for varying the cross-sectional area of the exhaust passage and a valve shaft carrying the valve member, the valve shaft having an axis extending substantially perpendicularly to the bank line.

The four-stroke-cycle multi-cylinder engine is a four-stroke-cycle four cylinder engine, the exhaust pipes extending from the four cylinders include two pipes disposed to each lateral side of the motorcycle body, which are collected into one exhaust pipe section on each lateral side, the exhaust pipe sections on both lateral sides are collected (assembled) into the single exhaust pipe collection unit connected to the interconnecting pipe.

The motorcycle is provided with a cowling which covers at least a portion of the body frame and which has a rear lower end portion shaped to cover at least a front lower end portion of the valve mechanism.

According to the structure of the present invention mentioned above, the resistance in the exhaust pipes at the engine high revolution operation (high speed operation) can be significantly reduced, and moreover, the output thereof can be improved at the engine intermediate or low revolution operation range by the utilization of the pulsation effect.

According to the arrangement of the valve mechanism of the present invention, the dead space can be effectively utilized in comparison with the prior art arrangement without adversely affecting peripheral equipments or like.

Furthermore, the valve mechanism is arranged above the lowermost position of the motorcycle body behind the exhaust pipe collection unit, so that any adverse affect will not be imparted to the engine lower portion, cawling shape, bank angle and so on of the motorcycle.

Furthermore, according to the present invention, the drive cable can be easily located and operated.

The nature and further characteristic features of the present invention will be made more clear from the following descriptions made with reference to the accompanying drawings.

DESCRIPTION OF THE PREFERRED EMBODIMENTS

Figure 1:
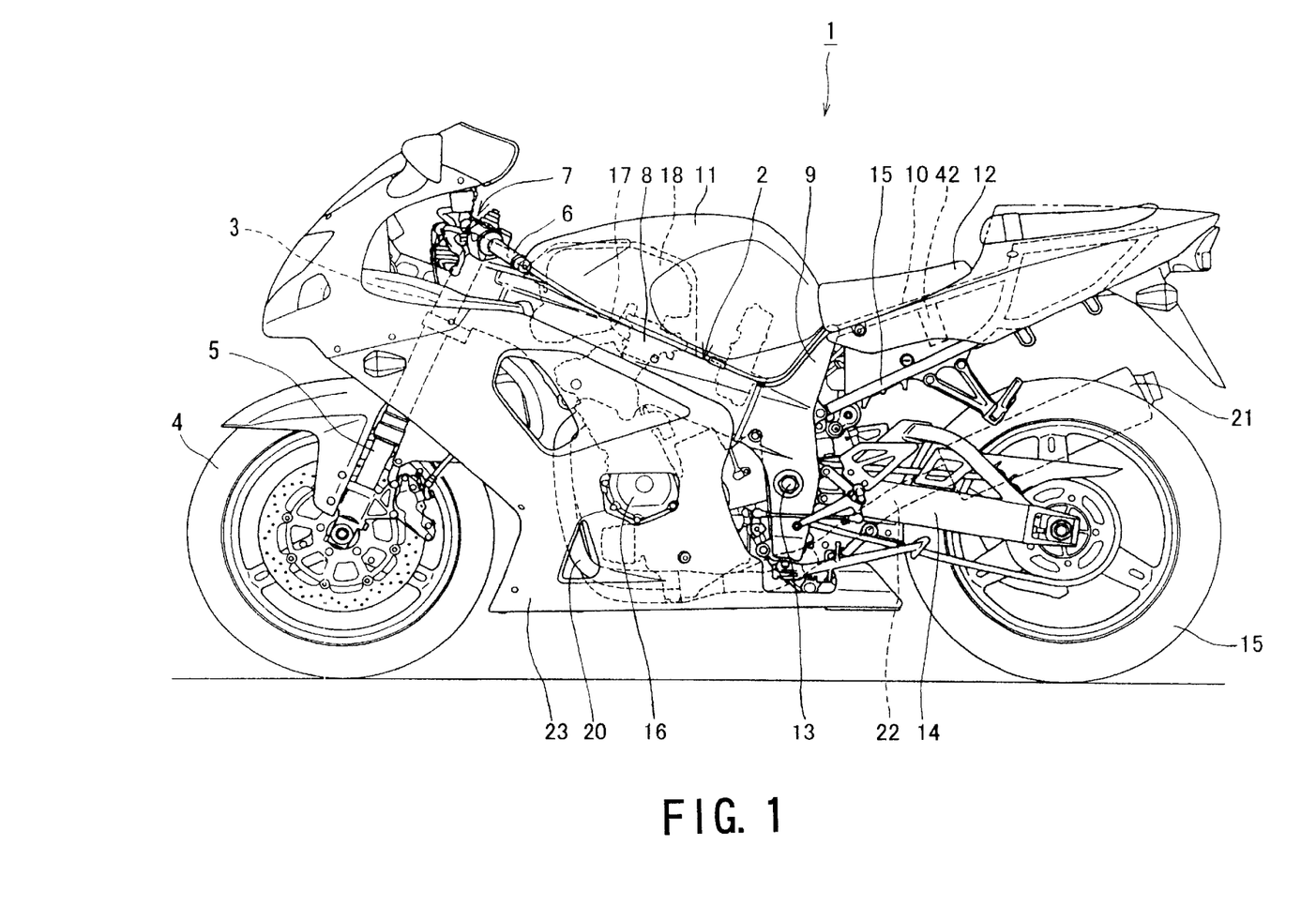
FIG. 1 is a left-side elevational view of a motorcycle incorporating an exhaust control system embodying the present invention.
Figure 2:
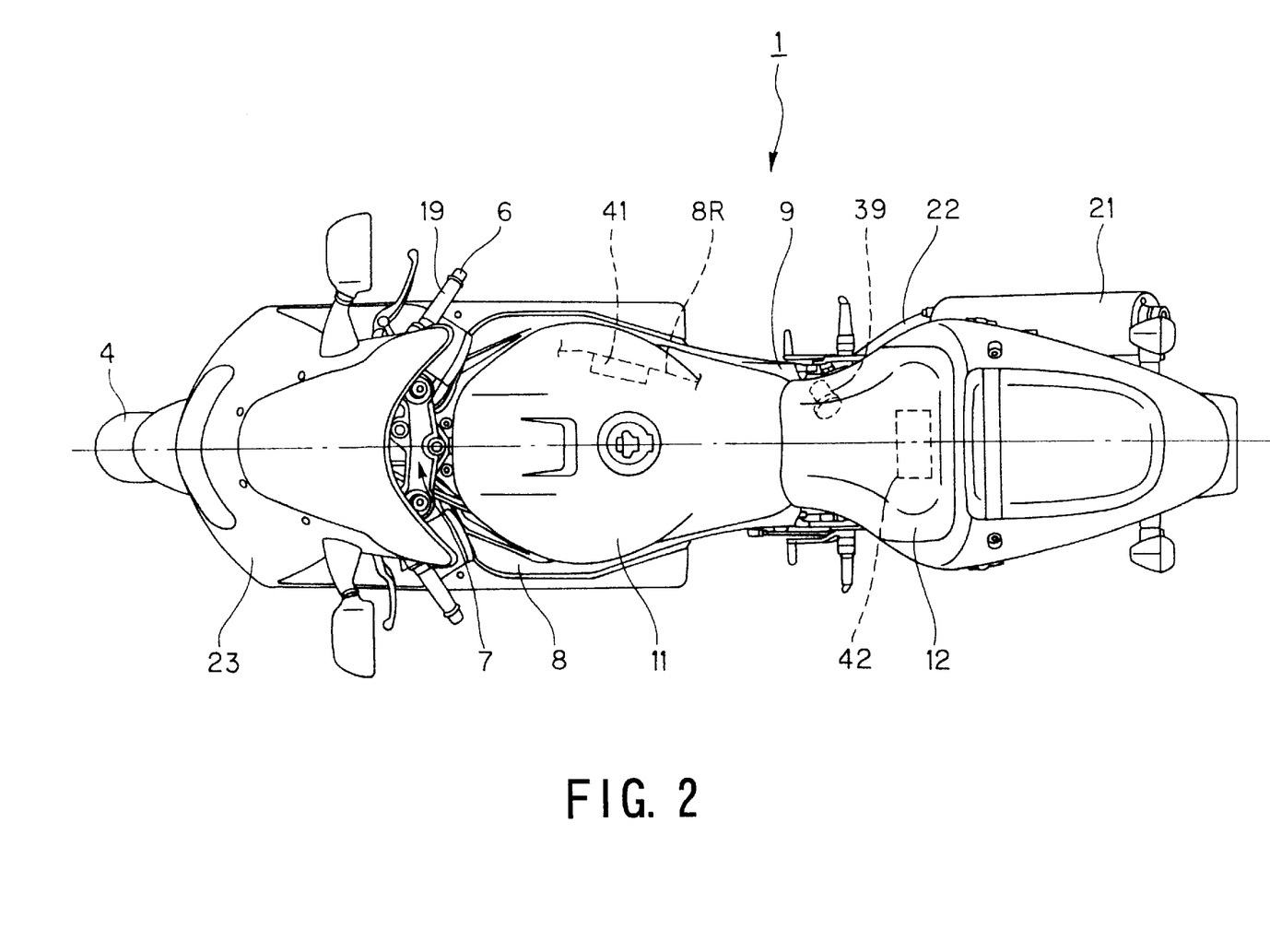
FIG. 2 is a top plan view of the motorcycle.
Figure 3:
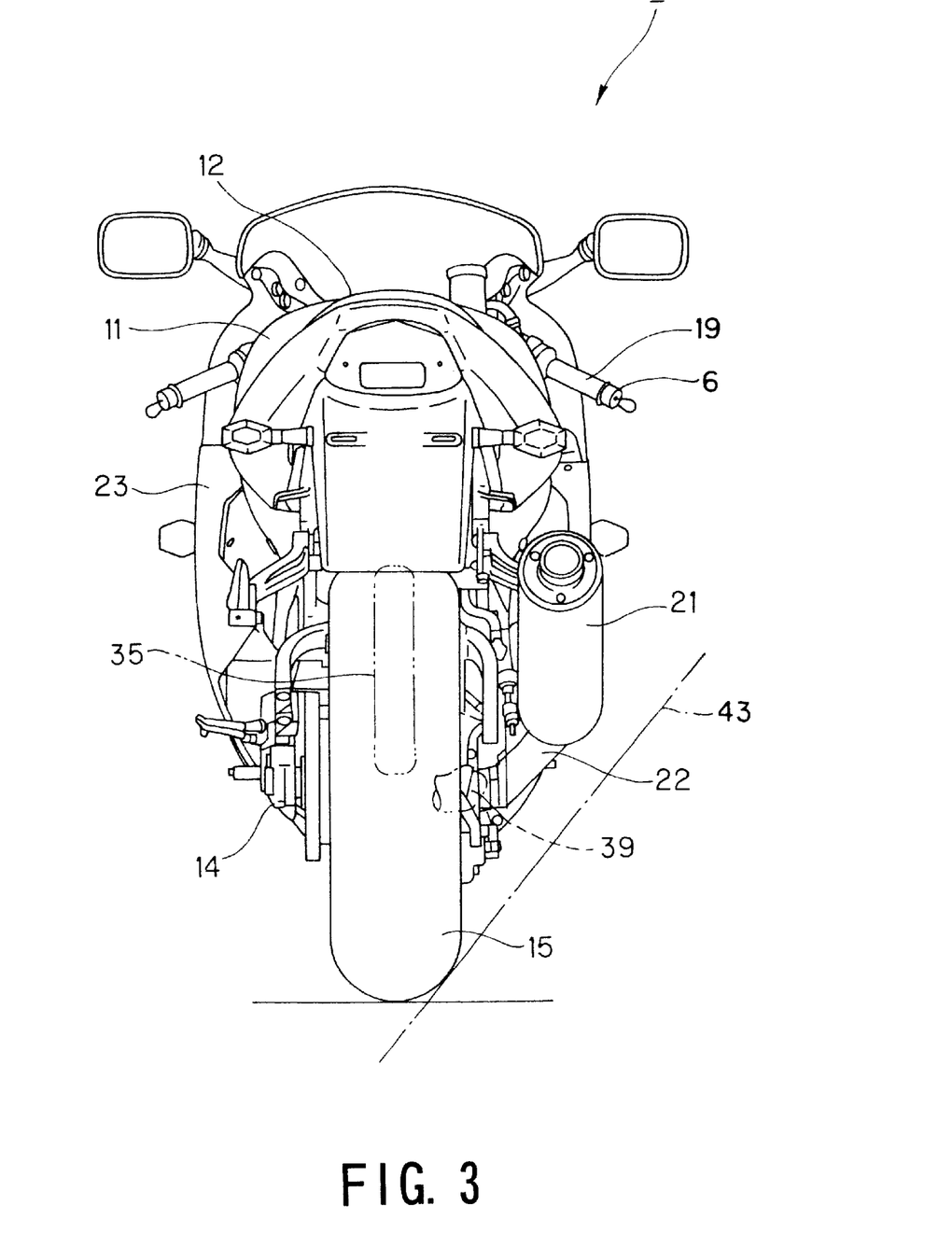
FIG. 3 is a rear elevational view of the motorcycle.

With reference to the accompanying drawings, in particular to FIGS. 1 to 3, a motorcycle 1 has a body (chassis) frame 2, which is provided, at its front end, with a head pipe 3. The head pipe 3 supports left and right front forks 5 which cooperate to support a front wheel 4 and which incorporate a suspension mechanism, not shown. The head pipe 3 also supports a steering mechanism 7 including a steering bar 6. A rider can steer the front wheel bilaterally (to left and right sides) by means of the steering bar 6.

Typically, the body frame 2 is of so-called twin-tube type which includes a main frame 8 which branches, at a position immediately behind the head pipe 3, into left and right main frame members that extend obliquely rearward and downward in parallel with each other. The main frame 8 also serves as a tank rail. The body frame 2 further has a center frame 9 which includes left and right center frame members connected to the rear ends of the left and right main frame members so as to extend substantially upright. Left and right seat rails 10 extend obliquely upward and rearward from end portions of the center frame 9.

A fuel tank 11 is installed on the main frame 8, and a seat 12 is placed on the seat rails 10. A pivot shaft 13 is mounted on the center frame 9 at a substantially central lower portion of the center frame 9. The pivot shaft 13 pivotally carries a swing arm 14 so that the swing arm 14 can swing about the axis of the pivot shaft 13. The swing arm 14 carries, at its rear end, a rear wheel 15 of the motorcycle.

A four-stroke-cycle multi-cylinder engine 16 is mounted on a substantially central portion of the body frame 2 and located under the fuel tank 11. A throttle body 17, which is a component of an intake system of the engine, is connected to an upper rear portion of the engine 16. An air cleaner 18 is connected to an upstream end of the throttle body 17. The throttle body 17 has a throttle valve operatively connected, through a cable which is not shown, to a throttle grip 19 provided on the right end of the steering bar 6, so as to be opened or closed by a rider.

The engine 16 has an exhaust system which includes exhaust pipes 20 leading from the cylinders and extending rearward through a space beneath the engine 16. The exhaust system also includes a muffler 21 which is disposed on one side of the body frame. In the illustrated embodiment, the muffler 21 is disposed on the right side of the rear wheel 15 so as to extend obliquely upward. The exhaust pipes 20 and the muffler 21 are connected via an interconnecting pipe 22.

At least a portion of the body of the motorcycle is covered by a streamlined cowling 23. In the illustrated embodiment, the cowling 23 covers the front section to a central lower section of the motorcycle so as to reduce aerodynamic resistance and protect the rider.

Figure 4:
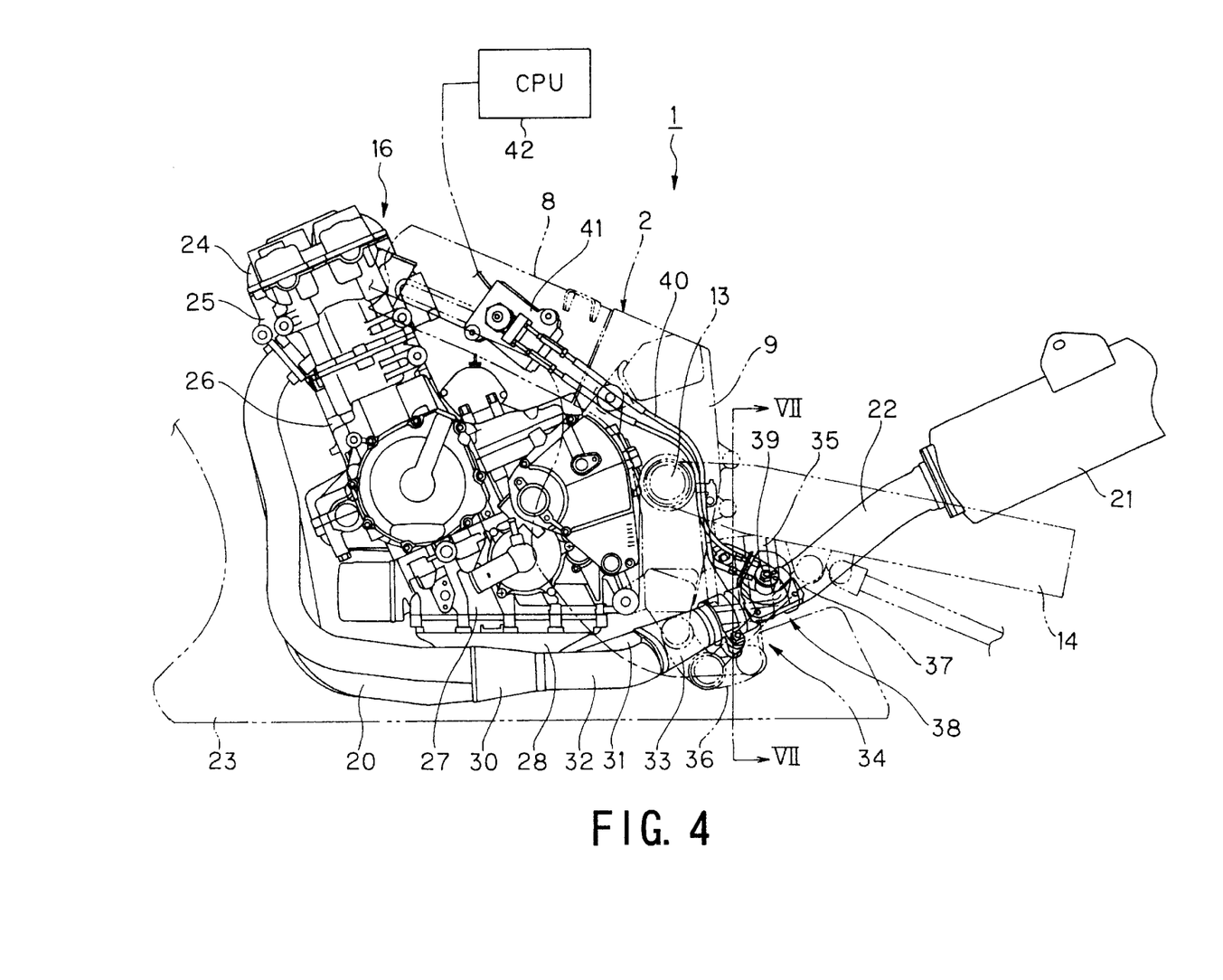
FIG. 4 is an enlarged left-side elevational view of an engine mounted to the motorcycle.
Figure 5:
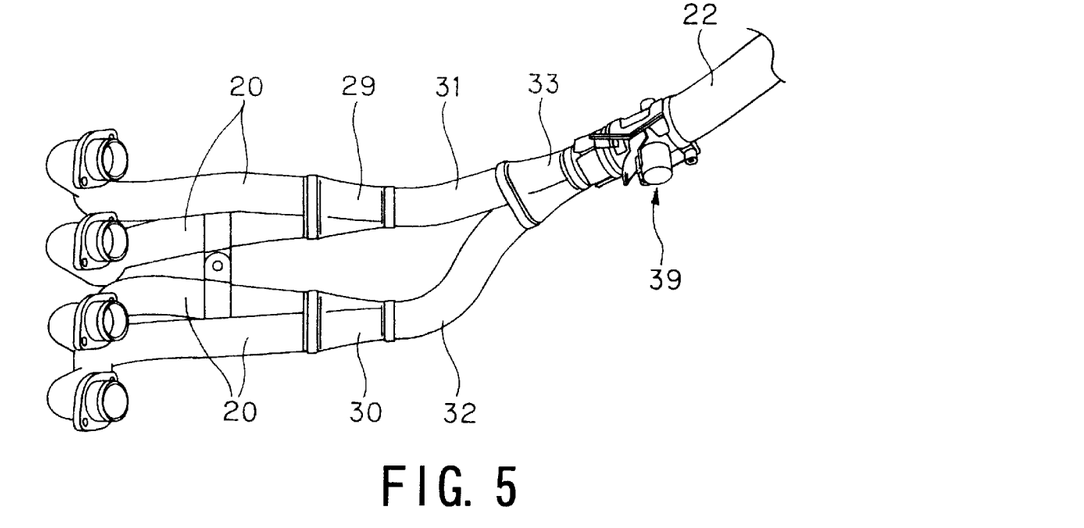
FIG. 5 is a plan view of an exhaust system of an engine of the motorcycle.
Figure 6:
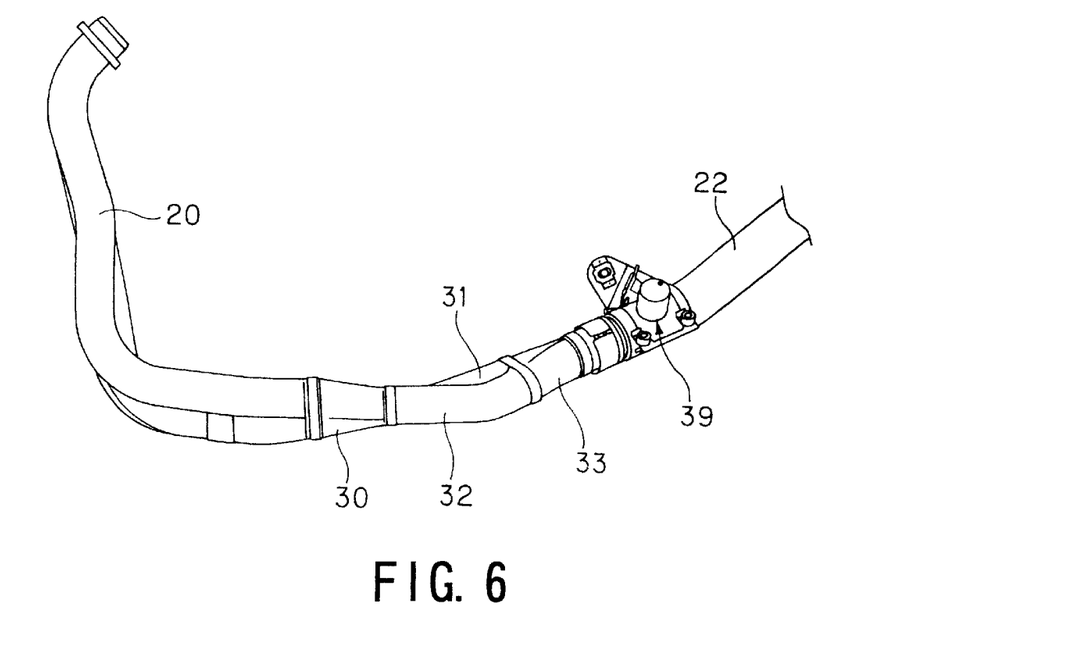
FIG. 6 is a left-side elevational view of the exhaust system.

FIG. 4 is an enlarged left-side elevational view of the engine 16, while FIGS. 5 and 6 are plan view and left-side elevational view of the exhaust system of the engine, respectively.

With reference to the shown example, the multi-cylinder engine 16 incorporating the exhaust system of the invention is a four-stroke-cycle, four-cylinder engine as shown in FIG. 4. The engine 16 has, from top to bottom in the illustration, a cylinder head cover 24, cylinder heads 25, a cylinder bock 26, a crankcase 27, and an oil pan 28. A transmission mechanism is connected to a rear portion of the crankcase 27, though not shown.

As will be clear from FIGS. 4, 5 and 6, one exhaust pipe 20 is connected to a front portion of the cylinder head 25 of each cylinder, and accordingly, in the illustrated embodiment, four exhaust pipes 20 in total are shown. Among these four exhaust pipes 20, two exhaust pipes which are on the right side of the body of the motorcycle as viewed in the running direction of the motorcycle are collected in each other at a first collecting portion 29 into a single right joint pipe 31 extending rearward therefrom. The first collecting portion 29 is disposed beneath a right portion of the oil pan 28. Likewise, two exhaust pipes which are on the left side of the motorcycle body are collected in each other at a second collecting portion 30 into a single left joint pipe 32 extending rearward therefrom. The second collecting portion 30 is disposed beneath a left portion of the oil pan 28. The right joint pipe 31 and the left joint pipe 32 are collected in each other at a third collecting portion 33 as a single exhaust pipe collection unit. A muffler 21 is connected to the third collecting portion 33 via an interconnecting pipe 22. The interconnecting pipe 22 is disposed at a level above a level of a road clearance which, in this case, is presented by the lowermost end of the cowling 23.

The aforementioned swing arm 14 is resiliently supported to be swingable on the body frame 2 by means of a rear shock-absorbing unit 34. The rear shock-absorbing unit 34 includes a rear shock absorber 35, a link lever 36 and a link rod 36. As will be seen from FIG. 3, the rear shock absorber 35 extends substantially upright as viewed from the rear end of the motorcycle. The rear shock absorber 35 is pivotally connected, at its upper end, to a rear central portion of the center frame 9 as shown in FIG. 1 and, at its lower end, to a lower end portion of the center frame 9 through an arcuate link lever 36. To a central portion of the link lever 36 is connected one end of a link rod 37, the other one end of which is pivotally connected to a lower portion of the swing arm 14.

The exhaust system of the motorcycle 1 is provided, at its intermediate portion, with an exhaust control system 38 which serves to vary the cross-sectional area of the exhaust passage so as to control the pulsation of the exhaust gas. The exhaust control system 38 comprises a valve mechanism 39 which serves to vary the cross-sectional area of the exhaust passage, a drive motor 41 which drives the valve mechanism 39 through a drive cable 40, and a CPU (Central Processing Unit) 42 which controls the drive motor 41. By way of the example, the CPU 42 is disposed in a space under the rider's seat (see FIGS. 1 and 2), while the drive motor 41 is fixed to the inner side of the right main frame member 8R. As will be seen from FIGS. 4 to 6, the valve mechanism 39 is mounted on the interconnecting pipe 22 which interconnects the third joint (pipe collecting) portion 33 of the exhaust pipes and the muffler 21.

Figure 7:
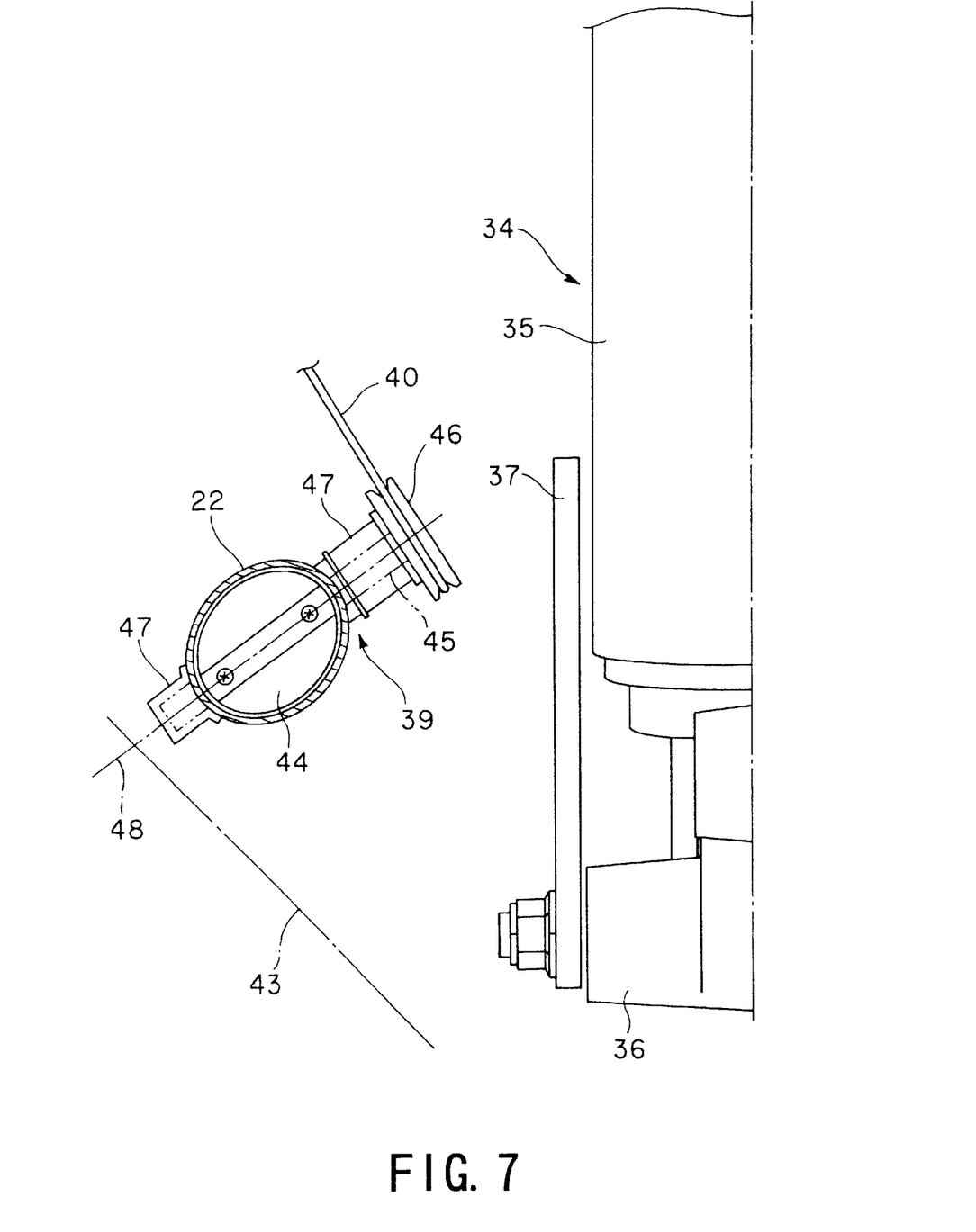
FIG. 7 is an illustrative sectional view taken along the line VII—VII of FIG. 4.

Referring to FIG. 4 and FIG. 7 which is a sectional view taken along the line VII—VII of FIG. 4, the valve mechanism 39 is located under the swing arm 14 that extends rearward from the main frame 8, more specifically, within a triangular zone formed between the rear shock absorbing unit 34 and a bank line 43 indicating the maximum allowable bank angle, i.e., leaning angle, of the motorcycle body. In the illustrated embodiment, the valve mechanism 39 is disposed at a portion of the triangular zone adjacent to the third joint portion 33 upstream of the interconnecting pipe 22. The rear lower portion of the cowling 23 is shaped so as to cover at least a front lower end portion of the valve mechanism 39.

As will be seen from FIG. 7, the valve mechanism 39 mounted to the interconnecting pipe 22 includes a valve member 44, a valve shaft 45 and a pulley 46. The valve member 44 is supported by a valve shaft 45 and is disposed in the interconnecting pipe 22. The valve shaft 45 is rotatably supported by a bearing 47 externally of the interconnecting pipe 22.

The valve shaft 45 is disposed so that its axis 48 extends substantially perpendicularly to the bank line 43 mentioned hereinbefore. The end of the valve shaft 45 adjacent to the rear shock absorber unit 34 extends outward from the bearing 47 and carries a pulley 46 fixed integrally therewith. A drive cable 40 extending from the drive motor 41 is wound around the pulley 46. In operation, the valve member 44 in the interconnecting pipe 22 is driven by the power of the driver motor 41 to be rotatable within the interconnecting pipe 22 to thereby vary the cross-sectional area of the exhaust passage in the interconnecting pipe 22.

Figure 8:
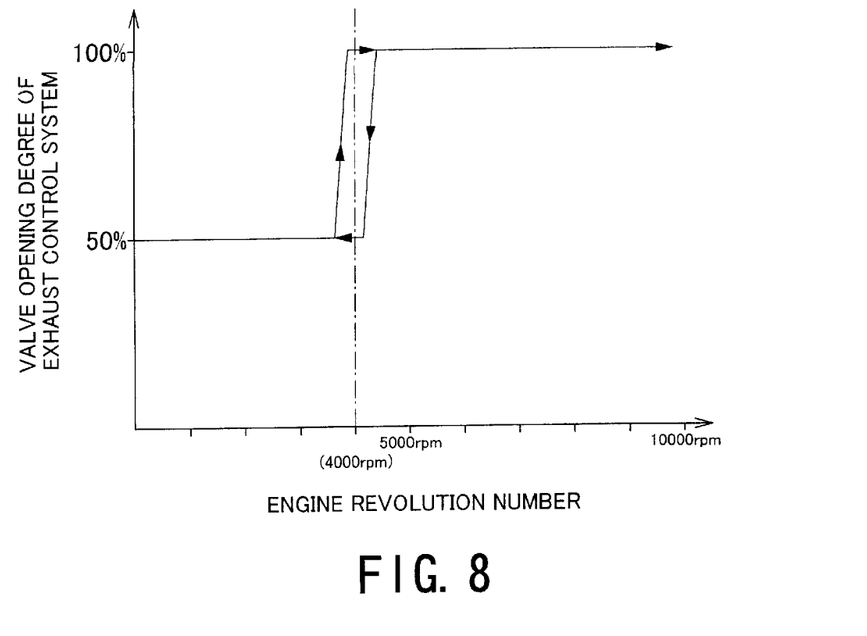
FIG. 8 is a graph showing the relationship between the degree of opening of a valve of an exhaust control system and engine speed (engine revolution per minute)

FIG. 8 is a diagram which shows, by way of example, a basic pattern of the valve-opening characteristic, i.e., the relationship between the opening degree of the valve of the exhaust control system 38 and the engine speed. That is, with reference to FIG. 8, as shown by a curve "A", the valve member 44 is set at 50% opening degree until the operating speed of the engine 16 reaches a predetermined range, e.g., 4000 rpm or so, and to 100% opening degree (full-open) when the predetermined engine operation range is exceeded.

Figure 9A:
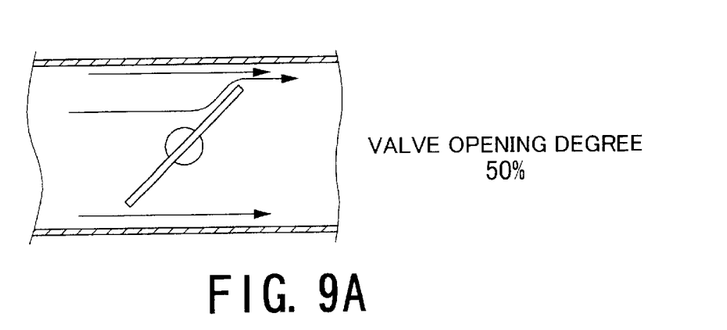
FIGS. 9A and 9B are schematic illustration of the valve disposed in an interconnecting pipe at 50% and 100% opening degrees, respectively.
Figure 9B:
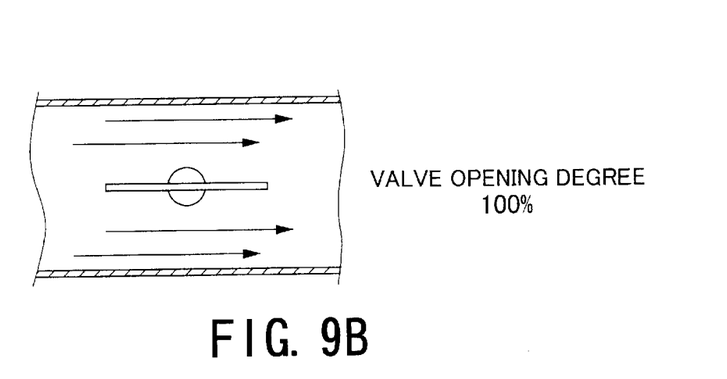

FIG. 9A shows the valve member 44 disposed inside the interconnecting pipe 22 at the 50% opening degree, while FIG. 9B shows the valve member 44 at the 100% opening degree. Arrows in these figures indicate the streams of the exhaust gases.

In operation, the CPU 42 receives data indicative of the engine speed from an engine speed sensor, not shown, on the engine 16. The CPU 42 thus detects the engine speed and delivers an ON/OFF signal to the drive motor 41 to thereby open and close the valve member 44.

Although, in the illustrated embodiment, the valve opening degree is set to 50% until a predetermined engine speed is achieved, the degree of opening of the valve member 44, before the predetermined engine speed has been achieved, may obviously be varied depending on factors such as engine displacement, type of the motorcycle, and so on. Thus, the opening degree of the valve member 44 may be set to be greater than 50% as indicated by a curve "B" until the predetermined engine speed is achieved.

Figure 10:
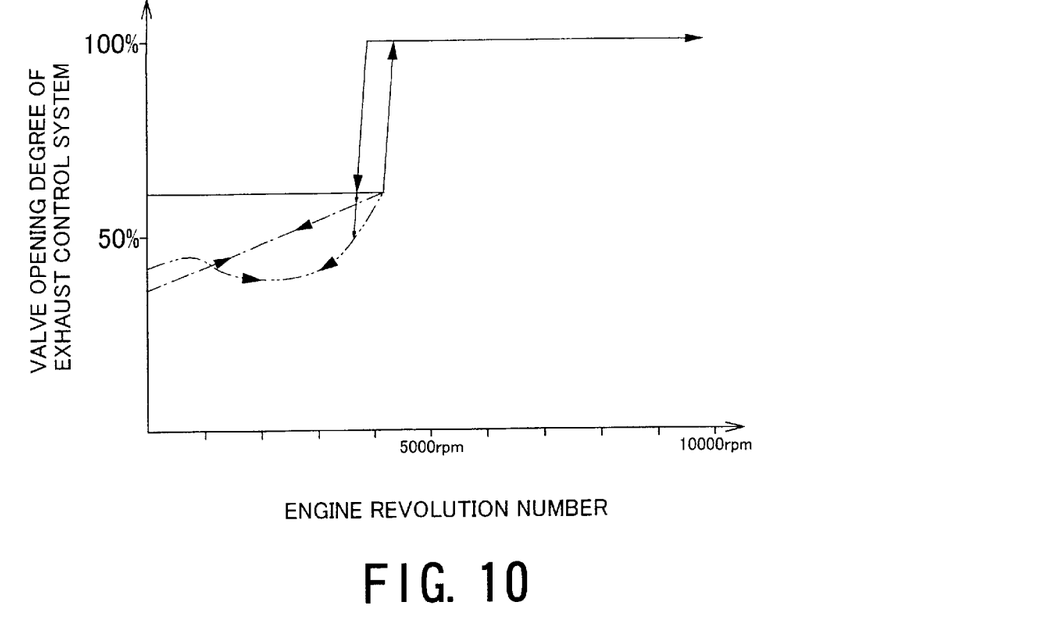
FIG. 10 is a graph showing another example of the relationship between the valve opening degree and the engine speed.

The illustrated embodiment of the exhaust control system of the present invention may also have an arrangement in which, as indicated by a curve "C" in FIG. 10, the opening degree of the valve member 44 is set to be 50% or smaller at a time when the engine speed is zero rpm, i.e., when the engine is not driven, and is progressively increased in response to the increasing of the engine speed so as to finally reach 100% at a time when the engine has been accelerated to a predetermined speed.

In the embodiment herein described, the running, i.e., driving, speed of the engine 16 alone is used as a parameter for the control of the opening degree of the valve member in the valve mechanism. The present invention is not limited to the described one and the exhaust control system 38 of the present invention may rely upon factors such as data indicative of the state of operation of the engine. For instance, the described embodiment may be modified such that CPU 42 receives, in addition to the engine speed data, data from a throttle opening sensor, not shown, associated with the throttle grip 19 or the throttle body 17, as well as data from a gear position sensor, not shown, provided for the transmission gear mechanism. Thus, the CPU 42 controls the opening degree of the valve member 44 of the exhaust control system 38 in accordance with the operating conditions of the engine, e.g., throttle opening degree and/or gear position, until the predetermined engine speed is achieved, as indicated by a curve "ID" in FIG. 10.

In the embodiment and modification of the present invention described hereinabove, the opening degree of the valve member 44 is controlled in two stages, which is also illustrative, and the described embodiment may further be modified such that the opening degree of the valve member 44 is controlled in more than two stages, e.g., three stages, as indicated by a curve "E" in FIG. 11. In such a case, the controlling may be performed such that the opening degree of the valve member 44 is controlled in three or more stages during acceleration, i.e., during the time when the engine speed is increasing, whereas, during deceleration, the valve opening degree is controlled in only two stages, as shown by a curve "F" in FIG. 11. During the deceleration, the valve member 44 may be closed at once as indicated by a curve "F" in FIG. 11 or may be progressively closed as indicated by a curve "G" in the same Figure.

Figure 11:
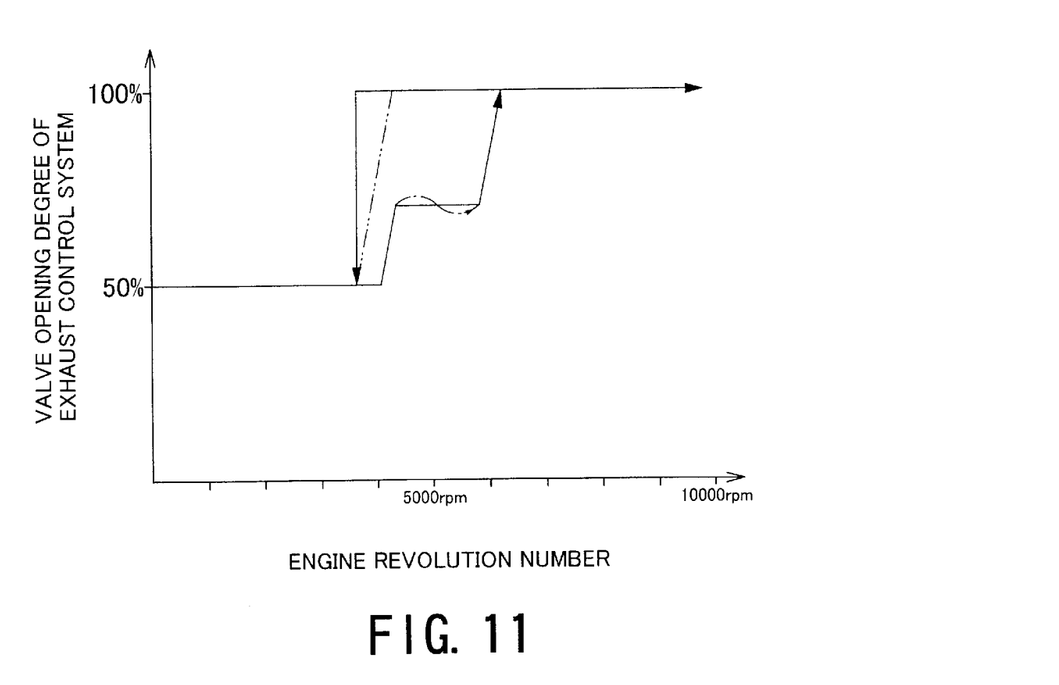
FIG. 11 is a graph showing still another example of the relationship between the valve opening degree and the engine speed.

Further, the opening degree of the valve member of the exhaust control system may be curvilinearly controlled in accordance with the state of engine operation, e.g., the throttle opening and/or the gear position, as indicated by a curve "H" in FIG. 11.

As will be understood from the foregoing description, the motorcycle incorporating the exhaust system provided with the exhaust control system embodying the present invention has an exhaust system including the exhaust pipes 20 leading from the cylinders of a multi-cylinder engine, the exhaust collecting portion 33 through which the exhaust pipes 20 are collected together, and the muffler 21 connected to the exhaust collecting portion through the interconnecting pipe 22. The exhaust control system 38 is provided with the a valve mechanism 39 operated in association with the interconnecting pipe 22 interconnecting the exhaust collecting portion 33 and the muffler 21 and arranged to vary the cross-sectional area of the exhaust passage in the interconnecting pipe 22 so as to control the pulsation of the exhaust gas. The exhaust control system effectively controls the pulsation of the exhaust gas so that the output power of the engine 16 is enhanced in the low-to-intermediate speed range, while reducing the resistance against the flow of exhaust gases in the exhaust pipes 20, thus preventing the reduction of the engine output power during the high-speed operation of the engine 16.

A triangular zone is defined as a dead space between the rear shock absorber 34 and the bank line 43 indicating the maximum bank angle of the motorcycle body below the swing arm 14 behind the main frame 8. This dead space can be effectively utilized by disposing the interconnecting pipe 22 for the valve mechanism 39 in this triangular zone without restricting the layout of the components of the motorcycle around the interconnecting pipe 22.

The interconnecting pipe 22 provided with the valve mechanism 39 is located at a position which is at the rear side of the collecting portion 33 of the exhaust pipes 20 and above the road clearance level of the motorcycle body. This allows the interconnecting pipe 22 to be disposed without restricting the volume of the oil pan 28 and without affecting the design of the cowling 23. The maximum bank angle also is not affected. Since the valve mechanism 39 is provided in the interconnecting pipe 22, which is disposed at the position described above, the road clearance of the motorcycle body is not changed.

The valve shaft carrying the valve member 44 of the valve mechanism 39 is arranged so that its axis 48 extends substantially perpendicularly to a bank line 43 that indicates the maximum bank angle of the motorcycle body. This arrangement contributes easy installation and operation of the drive cable 40 which interconnects the valve mechanism 39 and the drive motor 41 without affecting the bank angle of the motorcycle body.

The motorcycle 1 has a cowling 23 which covers front to central lower portion of the motorcycle body and which has a rear lower end portion shaped to cover at least a front lower end portion of the valve mechanism 39. According to this arrangement, it is possible to protect the valve mechanism 39 from sand particles, pebbles, water and mud which may be sprung up by the front wheel 4 of the motorcycle. The cowling 23 also serves to hide the valve mechanism 39, thus improving the appearance of the motorcycle.

Further, although the present invention has been described through its specific form, it is to be understood that the described embodiment and modifications are only illustrative and that various changes and further modifications may be made without departing from the scope of the present invention which is limited solely by the appended claims.

What is claimed is:

1. An exhaust system of a motorcycle which has a body frame including a head pipe supporting a front wheel of the motorcycle, a main frame which branches, at a position immediately behind the head pipe, into a pair of lateral main frame members that extend obliquely rearward and downward, a center frame including a pair of lateral center frame members connected to the rear ends of the main frame members so as to extend substantially upright, and a pair of lateral seat rails extending obliquely upward and rearward from end portions of the center frame members, and in which a swing arm supporting a rear wheel of the motorcycle is supported swingably and resiliently to the body frame by a rear shock absorber, and a four-stroke-cycle multi-cylinder engine is mounted on to the body frame, said exhaust system comprising:

exhaust pipes leading from the respective cylinders of the engine, said exhaust pipes being collected as a single exhaust pipe collection unit;

a muffler to which said exhaust pipe collection unit is connected;

an interconnecting pipe section through which the exhaust pipes and the muffler are operatively connected; and an exhaust control system for controlling pulsation of an exhaust gas, said exhaust control system including a valve mechanism mounted to the interconnecting pipe section so as to vary a cross-sectional area of an exhaust passage and a drive unit for operating the valve mechanism, said valve mechanism being located at a position under the swing arm behind the main frame within a triangular zone formed between the rear shock absorber and a bank line that indicates a maximum bank angle of a body of the motorcycle.

2. An exhaust system according to claim 1, wherein said valve mechanism is located at a position at a rear side of the exhaust pipe collection unit and above a road clearance level of the motorcycle body.

3. An exhaust system according to claim 1, wherein said valve mechanism includes a valve member for varying the cross-sectional area of the exhaust passage and a valve shaft carrying the valve member, said valve shaft having an axis extending substantially perpendicularly to a bank line that indicates the maximum bank angle of the motorcycle body.

4. An exhaust system according to claim 1, wherein said four-stroke-cycle multi-cylinder engine is a four-stroke-cycle four cylinder engine, said exhaust pipes include two pipes disposed to each lateral side of the motorcycle body, which are collected into one exhaust pipe section, said exhaust pipe sections on both lateral sides are collected into the single exhaust pipe collection unit connected to the interconnecting pipe section.

5. An exhaust system according to claim 1, wherein the motorcycle is provided with a cowling which covers at least a portion of the body frame and which has a rear lower end portion shaped to cover at least a front lower end portion of the valve mechanism.

* * * * *